United States Patent Office 3,796,593
Patented Mar. 12, 1974

3,796,593
POLYURETHANE COMPOSITION AND ITS USE
TO FORM POLYSTYRENE LAMINATES
Anthony F. Finelli, Akron, and Richard L. Wert, Cuyahoga Falls, Ohio, assignors to The Goodyear Tire & Rubber Company, Akron, Ohio
No Drawing. Filed June 28, 1971, Ser. No. 157,700
Int. Cl. B44d 5/00
U.S. Cl. 117—104                                             4 Claims

ABSTRACT OF THE DISCLOSURE

This invention relates to polyurethane compositions and to a method of applying polyurethane coatings to polystyrene to produce laminates. The polyurethane compositions are the reaction product of a reactive hydrogen containing material of 400 to about 12,000 molecular weight, an organic polyisocyanate and a curative which has been dispersed in a solvent to render the mixture sprayable and the mixture is applied against a surface of polystyrene as a spray with or without a gaseous spray medium at a pressure preferably of at least 60 pounds per square inch.

---

This invention relates to polyurethane compositions and to a method of applying polyurethane coatings to polystyrene and to the resulting laminates.

Because of its low cost and ease of fabrication polystyrene has become a large volume plastic and especially has found use in foam articles forming a part of refrigerators, coolers, ice chests, furniture items, surfboards or even parts of caskets, roof decks, boats, etc. It has been appreciated that notwithstanding its cost and wide use that polystyrene has certain inherent disadvantages such as poor solvent resistance and is easily torn, chipped and scuffed. Therefore, it has been desirable for some time to apply a protective film or coating over the styrene surface to protect it from solvents, tearing, or chipping, and also to improve its aesthetic appearance and resistance to water deterioration.

Since polyurethanes have excellent resistance to solvents, scuffing, chipping and tearing, it was thought that a polyurethane coating should be applied over the polystyrene. Unfortunately, when it was attempted to coat the polyurethanes on the polystyrene, it was found that the solvents in the polyurethane reaction mixtures materially affected the structural stability of the polystyrene and this has not been heretofore achievable easily and economically.

Therefore, an object of this invention is to provide novel polyurethane compositions which can be coated or laminated to a polystyrene without destroying the structural integrity of the polystyrene and also to provide polystyrene polyurethane laminates and the method of making said laminates that are more economical and that do not require unusual solvents.

The above objects and other advantages may be achieved by forming a polyurethane reaction mixture in a suitable low boiling solvent hereinafter described and air spraying or airless spraying the solvent solution of the polyurethane reaction mixture to the polystyrene to give it a coat of the desired thickness, essentially free of the solvent at the time said polyurethane reaction mixture coats the polystyrene.

The nature of this invention may be more readily exemplified and understood by the following representative examples wherein all parts are by weight unless otherwise indicated.

EXAMPLE I

A liquid prepolymer having 4.9 percent NCO (hereinafter designated as prepolymer A was prepared from 1000 molecular weight polypropylene ether glycol and 4,4′-dicyclohexylmethane diisocyanate. Stannous octoate was added as catalyst. Para tertiary butyl cresol was added as an antioxidant.

Another liquid prepolymer (hereinafter designated as prepolymer B), having 6.8 percent NCO was prepared from 1000 molecular weight polytetramethylene azelate (945 parts), castor oil (—DB grade) (1688 parts) and 4,4′-dicyclohexyl methane diisocyanate (1840 parts). Para tertiary butyl cresol was added to the prepolymer as antioxidant.

Isophorone diamine in methyl ethyl ketone/methyl isobutyl ketone (1/1/3 mixture) was used as curative for the prepolymers A and B.

The mix of the prepolymer and the curative was sprayed at 60 pounds per square inch with a De Vilbiss PGA spray gun equipped with a No. 306 air cap onto a polystyrene foam surface and results are shown in Table 1:

TABLE 1
[Experimental]

| Recipe number | 1 | 2 | 3 | 4 | 5 | 6 |
|---|---|---|---|---|---|---|
| Prepolymer A | 80 | 80 | 80 | | | |
| Prepolymer B | | | | 80 | 80 | 80 |
| Isophorone diamine in MEK/MIBK (1/1/3) | 36 | 36 | 36 | 49 | 49 | 49 |
| Trichloroethylene | 20 | | | 20 | | |
| Mineral spirits | | 20 | | | 20 | |
| Hexane | | | 20 | | | 20 |
| Propyl gallate 5% in MEK | 1 | 1 | 1 | 1 | 1 | 1 |
| Pigment dispersion (in Epon 828) | 5 | 5 | 5 | 5 | 5 | 5 |
| Pigment color | Aqua | (¹) | Red | Aqua | (¹) | Red |
| Methyl ethyl ketone | 4 | 4 | 4 | 4 | 4 | 4 |
| Comment | No deterioration of polystyrene foam surface | | | | | |

¹ Dark blue.

The coatings showed good protection of the Styrofoam surface without affecting the structure of the Styrofoam.

Where the Styrofoam was molded in the shape of a surfboard or a sailboat, the polyurethane coating materially improved the resistance to tear or impact, and water.

The coatings on the Styrofoam contributed abrasion and scuff resistance to the Styrofoam and also enhances the appearance of the article or container, especially when a small amount of a blue or red pigment dispersed in an Epon resin or lacquer of the vinyl, vinyl acrylic or acrylic type was added to the polyurethane reaction mixture to enhance the decorative decor, preferably when added in subsequent coats.

EXAMPLE II

Refrigerator door panels molded from rigid polystyrene cannot be insulated on the backside with rigid polyurethane foam because the solvents used as blowing agents in the rigid urethane foam recipes attack and destroy the polystyrene. To allow the rigid urethane foam insulation to be applied in back of the polystyrene, an elastomeric urethane coating was first sprayed on the backside by the technique of Example I.

Where the polyurethane mixture from Example I was sprayed on the backside of a rigid polystyrene refrigerator door panel and cured at room temperature to give a strong elastomeric coating on the back of the panel, the polystyrene is protected from the damaging effects of the solvents in the polyurethane foaming recipe such as methylene dichloride or the fluorocarbons such as Freon 11 used to insulate the refrigerator.

Body coats to impart strength and color can be sprayed over the seal coat of Examples I or II, for instance, where desired. The body coat can be prepared from a prepolymer consisting of the reaction product of 1 mole of polytetramethylene adipate having a molecular weight of 1000 and two moles of 80/20 2,4/2,6 tolylene diisocyanate. The prepolymer (100 parts) can be diluted with 30 parts methyl ethyl ketone, 30 parts toluene and 5 parts of 10 percent cellulose acetate butyrate in Cellosolve acetate. To 100 parts of the above diluted prepolymer was added 26 parts of the curative solution used for the sealer coat and 10 parts of a red vinyl-acrylic lacquer. All spray coats were allowed to cure at room temperature.

Topcoats for the final colors on the articles were sprayed using a polyurethane reaction mixture having nondiscoloring properties and pigmented with a lacquer of the vinyl-acrylic resin binder. The sprayable nondiscoloring polyurethane reaction mixture was prepared from a mixture of 1 mole of polytetramethylene adipate having a molecular weight of 1000, ½ mole of polytetramethylene adipate of 2000 molecular weight and 3 moles of 4,4'-dicyclohexylmethane diisocyanate. The prepolymer analyzed 4.3 percent isocyanate content (4.3% NCO). The prepolymer was diluted with toluene to 50 percent solids. A curative solution was prepared from 100 parts 3-aminomethyl-3,5,5-trimethyl cyclohexylamine and 400 parts methylisobutyl ketone. This was allowed to age at room temperature at least 24 hours.

To 100 parts diluted prepolymer was added 20 parts curative solution and 10 parts white vinyl acrylic lacquer. After stirring well, the mix was sprayed over the sealer coat to produce a white patent leather finish over the shaped polystyrene foam.

The polyurethane reaction mixtures useful in this invention are any of those known to the art which do not contain sufficient solvent to affect the surface structure of polystyrene. These polyurethane reaction mixtures can be prepared by any of the well-known methods such as the one-shot or prepolymer with or without solvent.

The polyurethane reaction mixture broadly comprises a reactive hydrogen containing material usually of about 400 to 12,000 molecular weight, an organic polyisocyanate and a curative with sufficient diluent to render the mixture sprayable, with an air spray gun or an airless spray gun to a polystyrene surface. It is preferred that the mixture have an open time or pot life of at least 15 seconds to permit it to be readily sprayed.

The polyester polyols, polyether polyols, and the hydrocarbon polyols are representative families of the broad class of materials belonging to the reactive hydrogen containing materials and specific members of these families are shown in U.S. Pats. 2,937,151, 2,922,940 and 3,016,-356. Also, representative members of the organic polyisocyanates are given in the above-listed patents.

The curative can be water, monomeric or low molecular weight polyols and organic polyamines. Representative examples of these polyols are the glycols of 2 to 20 carbon atoms, trimethylol ethane, trimethylol propane and glycerine. The polyamines are preferably organic diamines of the aliphatic, alicyclic and aromatic class having from about 2 to 20 carbon atoms.

Usually about 1 to 3.5 moles of organic polyisocyanate for each mole of reactive hydrogen containing material is used with the amount of curative being adjusted to give from about 0.1 to 0.9 moles of curative for each mole of isocyanate in excess of the reactive hydrogen containing material, although it is possible to use as much as about 1.1 moles with certain accelerators such as mercaptobenzothiazole without the physicals of the cured polyurethane being affected adversely.

Normally the amount of diluent used is about 5 to 90 percent depending on viscosity of the polyurethane reaction mixture and whether the prepolymer or one-shot method of preparation is used. Also, the liquid or easily liquified prepolymers are desired as less solvent is required. It should be appreciated that the diluent must be low boiling and relatively volatile. Thus, the diluent or solvent is usually a hydrocarbon ketone, or chlorinated hydrocarbon boiling below about 300° F. and preferably below 250° F. These solvents are well known and normally are used in the paint industry as resin or paint solvents. Representative examples are methyl ethyl ketone, acetone, methyl isobutyl ketone, toluene, benzene, hexane, octane, chlorobenzene, chloro octane, chlorinated methane or ethylene or the fluorinated derivatives thereof, such as the Freons. The liquid esters are useful, too.

Thus, by this invention it is possible to form sheets of high to low density foam such as 9 to 5, down to 2 pounds per cubic foot, and place it or fasten it on a supporting roof deck and then spray coating the polystyrene foam with a pigmented polyurethane to yield a more economical and improved roof for buildings. Alternately, the shingle grade styrene foam sheets can be precoated with polyurethane and then be fastened to the roof deck to provide an insulation barrier an an exposed roof member or decking.

A particularly advantageous article of commerce that can be produced from the practice of this invention is where a molded polystyrene container conventionally referred to as the ice chest 6-pack beer or soda pop container is equipped with a decorative flexible member where the polystyrene 6-pack container can be draped over the shoulder like a purse or carrying bag and the polystyrene container has been given a polyurethane coating in accordance with this invention and has been sprinkled with metallic flecks or other decorative luster imparting material, the polyurethane previously being given a suitable pigmentation to furnish a 6-pack container in the desired pigmentation or colors. A 6-pack container or related article treated in this manner can be utilized as a purse or carrying bag draped over the shoulders and also as an insulated container for frozen pop and related drinks.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a laminate comprising spray applying to the surface of a polystyrene a polyurethane reaction mixture having an open time of at least 15 seconds, comprising a mixture of one mole of a reactive hydrogen containing material of 400 to 12,000 molecular weight, about 1 to 3.5 moles of an organic polyisocyanate and a curative dispersed in sufficient diluent to permit the reaction mixture to be spray applied to the polystyrene during the open time to form a coat essentially free of the diluent at the time the mixture contacts the polystyrene, and curing to form a polyurethane coating adhered to said polystyrene.

2. The method of claim 1 wherein the polystyrene is a roof member having a density of about 9 to 5 cubic feet.

3. The method of claim 1 wherein the diluent is trichloroethylene.

4. The method of claim 1 wherein the polystyrene has a density of about 2 to 9 pounds per cubic foot.

References Cited
UNITED STATES PATENTS

| | | | |
|---|---|---|---|
| 3,640,938 | 2/1972 | Finelli | 161—190 X |
| 3,029,172 | 4/1962 | Glass | 161—190 X |
| 3,256,133 | 6/1966 | Wright et al. | 161—190 X |
| 3,428,609 | 2/1969 | Chilvers et al. | 161—190 X |

WILLIAM A. POWELL, Primary Examiner

U.S. Cl. X.R.

117—138.8 A; 156—278; 161—160, 190